United States Patent [19]

Kobayashi et al.

[11] 4,251,558
[45] Feb. 17, 1981

[54] METHOD OF MAKING GRANULAR BEAN PASTE

[75] Inventors: Masakazu Kobayashi, Tokyo; Kenji Abo, Aomori; Koh Harashima, Kawaguchi, all of Japan

[73] Assignee: Kanesa Miso Kabushiki-Kaisha, Aomori, Japan

[21] Appl. No.: 64,089

[22] Filed: Aug. 6, 1979

[51] Int. Cl.³ .............................................. A23B 4/04
[52] U.S. Cl. .................................. 426/473; 426/448; 426/459
[58] Field of Search ............... 426/448, 516, 517, 518, 426/460, 507, 473, 446, 459, 629

[56] References Cited

U.S. PATENT DOCUMENTS

| | | | |
|---|---|---|---|
| 3,290,155 | 12/1966 | Mustakas et al. | 426/448 |
| 3,447,929 | 6/1969 | Hale | 426/448 |
| 3,488,770 | 1/1970 | Atkinson | 426/448 |
| 4,044,157 | 8/1977 | Wilding | 426/448 |

*Primary Examiner*—Raymond N. Jones
*Assistant Examiner*—George C. Yeung
*Attorney, Agent, or Firm*—Shlesinger, Fitzsimmons & Shlesinger

[57] ABSTRACT

Bean paste having a good plasticity is advantageously made to granules through the transformation to strips, without any fear of coagulation thereof into a mass, on account of the bean paste being made to strips by an extrusion under such vacuum which excites immediate dryness and cooling of stripped bean paste.

3 Claims, No Drawings

METHOD OF MAKING GRANULAR BEAN PASTE

This invention relates to a method of making granular bean paste.

Bean paste, also known as miso (Sanseido's New Concise Japanese-English Dictionary, Eighth Edition, page 571) is a fermented soybean paste which, as far as its texture is concerned, resembles that of a very soft (smooth or chunky) peanut butter, or a firm cottage cheese. For a very thorough desciption of the nature of bean paste (miso), and the manner in which it is produced, reference is made to "The Book of Miso", written by William Shurtleff & Akiko Aoyagi, published by Autumn Press, Inc., 1976, and in particular pages 8, 29, 30, 32, 178, 208, 209, 232-237, 247 and 248. In brief, cooked rice or barley, partially fermented, is mixed with cooked soybeans and packaged in an airtight container where the mixture is allowed to ferment for some six to eighteen months, thus producing a high-protein seasoning (paste) which is deep and rich in flavor. As noted hereinafter, however, a demand for dry bean paste has developed in recent years.

While demands for dry bean paste have noticeably increased, it is usually in a powder form. However, since dry bean paste in a powder form is not easy to handle compared to powders in general, the granulation of bean paste has been sought for.

Conventional methods for the granulation of bean paste which have been practiced or tried, are (1) fludizing and granulating methods in which bean paste is pulverized after having been dried sufficiently to a water content of several %, coagulated to granules after having been again wetted to a water content of ten-odd %, and then dried again, (2) shearing and centrifugally blowing off methods in which bean paste of a water content of several % to ten-odd % is sheared within a cylindrical screen by means of rotary blades of a high velocity, and discharged out centrifugally through the screen, and (3) extrusion methods employing extruders and pellet mills, in which bean paste of ten-odd % is extrusion moulded.

In these methods, bean paste has to be made first to dry powders, or has to be dried once to a low water content below its plastic limit. Hence, their costs for having bean paste dried becomes comparatively high.

More in detail, the aforementioned conventional methods have following drawbacks. In the methods mentioned as (1) above, since bean paste has to be subjected to drying operations twice under a water content lower than ten-odd %, degradation such as loss of flavor and change of colors occurs, sometimes being accompanied with generation of chlorine gas on account of destruction of salt crystals at pulverization, which brings about further degradation of the paste. The method mentioned above as (2) does not adversely affect the quality of the paste, since this method does not require the re-humidification of paste and pulverization thereof, but cannot assure an even distribution of granular sizes, with inevitable production of some fine powders and minute granules which have to be used for other purpose or have to be returned to starting bean paste materials. High pressures required by an extrusion operation for performing the aforementioned method (3) induces the isolation of fatty substances of bean paste. Such fatty substances which come out onto surfaces of strip-formed bean paste degrade bean paste. A temperature elevation of bean paste due to its frictional resistance passing through an extruder under a high pressure also degrades bean paste. If a water content of bean paste is increased so as to make it soft and smooth in order to minimize a pressure underwhich the bean paste is extruded, said water content has to be the one higher than its plastic limit, whereby bean paste extruded and formed into strips from granules or particles can hardly keep its shape.

The other method which is known as a spraying and drying method, requires bean paste to be wetted with a large amount of water, whereby much time is required for drying sprayed granules, and granules become sometimes too small, as the result of being forcibly sprayed out.

Further another method in which bean paste is made to a solid body by having it completely frozen, broken to frozen granules, and freeze-dried without thawing, is not practical for bean paste, because a temperature for completely freezing bean paste is lower than $-50°$ C.

Compared to those conventional methods, the method in accordance with this invention is characterized firstly in a step in which bean paste is extruded with a softness of a water content of about 20 to 30% which is above its plastic limit, whereby the utilization of high pressure which degrades bean paste is avoided, and secondly in a next step in which in order to prevent the extruded stripformed bean paste strips from adhering to each other and from coagulating to a mass, a chamber within which the bean paste is extruded, is kept under a vacuum of less than several Torr., whereby a certain part of the water contained in the bean paste strips is suddenly vacuum-evaporated from its outer surfaces which become larger with its transformation to strips, and whereby bean paste is cooled down also by the evaporation of its water content which takes off heat from the bean paste, resulting in having strip-formed bean paste hardened and kept in its extruded forms on account of the aforementioned lowering of water content and vacuum cooling effect.

In order to keep extruded strip-formed bean paste in its forms and to prevent them from adhering each other, the above mentioned vacuum pressure has to be near to or below 4.6 Torr. by saturated vapor pressure of water of $0°$ C., and it has to be lower in its temperature and pressure when bean paste of higher water content is extruded.

Thus, in this invention method, the extrusion of bean paste into a chamber which is kept under vacuum, can produce granules of even sizes and of a high grade, without requiring the pulverization of bean paste. Not only granules of a high quality are obtainable in this invention, but also costs for a drying operation are largely reduced, because said operation is made not on bean paste which contains a remarkably high percentage of water and is in a form of mass, but on the bean paste which has been extruded and granulated and consequently has come to have larger exposed outer surfaces.

In order to accomplish the method of this invention most efficiently, a water content of bean paste to be supplied to an extrusion—granulating device has to be uniform throughout the bean paste. It is, however, not easy to have bean paste of even water content throughout it.

In general, a water content of bean paste suitable to this invention method is about 20% to about 30%. This range has to be limited more narrowly, for example, to 24%–27%, depending upon a kind of bean paste and a desired size of granules.

In order to have been paste having generally a water content of 50% to 45% on wet basis reduced to a water content to 20% to 30%, there are several ways including simply drying bean paste and thereby reducing its water content, increasing solid components by adding seasoning and other powdery materials, and the combination of the former two ways. Either one of the above ways can hardly assure even distribution of water content throughtout a mass of bean paste. To wit, in case of simply drying bean paste, water contents around the surface of a mass of bean paste become less than those of core parts, distribution of water content varying largely between outer parts and inner parts of the mass. Even when powdery materials such as seasoning is applied to bean paste either by sprinkling the materials over the paste or by sprinkling them over it and mixing them, uneven distribution of water content does occur unless they are kneaded. However, a torque for kneading bean paste of a water content of 20% to 30% is considerably large compared to the one required in case of raw bean paste. And, if bean paste of the aforementioned percentages are kneaded sufficiently enough to have an even distribution of water content, fatty substances in the bean paste isolate, and penetrate outwardly on surfaces of bean paste when it is extruded into strips even under a low pressure, whereby bean paste degrades noticeably.

Hence, another characteristic feature of this invention 20 lies in that even moisture distribution of bean paste of an average water content of 20% to 30% is made simply and efficiently by means of shearing the bean paste through blades which rotate at a high velocity. More particularly, when a mass of bean paste is subjected within a screen to blades rotating at a high velocity, it is cut to fragments of several mm. Centrifugal mixing of the fragments and collisions of fragments with each other within the screen bring about a considerable extent of eveness of their distribution of water content. The heap of fragments upon each other after they have passed through the screen further enhances eveness of their distribution of water content.

Bean paste which has been extruded into a vacuum chamber in a form of strips and cut to pieces or granules, or bean paste which has been extruded into a vacuum chamber in a form of strips and which needs to be crushed so as to be final granular products, is readily brought to a water content about its plastic limit or below said limit by having it succeedinglly subjected to a drying operation under a pressure similar to or lower than the vacuum pressure under which the bean paste was extruded. Further drying can be made either under vacuum or at an atmospheric pressure, as one desires.

Control of granular sizes can be made following the extrusion of bean paste to vacuum chamber, and during a drying operation held immediately next to the extrusion, or during a subsequent drying operation.

The granular bean paste thus obtained in accordance with this invention has, compared to those obtained by conventional methods such as the aforementioned fludizing and granulating method and spraying and drying methods, a larger specific gravity, and is consequently compact and moisture-proof, while porosity provided solely on its surfaces with a rapid evaporation of water content at the extrusion thereof into a vacuum chamber, makes granules instantly soluble.

What we claim is:

1. A method of manufacturing granular bean paste from bean paste, without subjecting the paste to high temperatures or pressures which would degrade the paste, which comprises forming a bean paste having a water content above its plastic limit and distributed uniformly throughout the paste, said water content being about 20 to 30% on wet basis, extruding said bean paste in strip form into a chamber kept under a vacuum or near to but less than about 4.6 Torr., whereby as the extruded strips of bean paste are subjected to said vacuum, a portion of their water content is instantly evaporated and the strips are instantly cooled down by said evaporation under the vacuum to such an extent that said strips are hardened and therefore maintain their forms without adhering to each other, and granulating said extruded strips to granules.

2. A method as claimed in claim 1, in which the forming of the bean paste to cause it to have a uniform water content of about 20 to 30% on wet basis comprises subjecting the bean paste, prior to the extrusion step, to a cutting and mixing operation conducted at a high velocity to form a mass of bean paste having an even distribution of water content.

3. A method as claimed in claim 2, in which the cutting and mixing of the bean paste comprises shearing a mass of the treated bean paste by forcing it through a screen by means of a plurality of blades rotating at a high velocity.

* * * * *